United States Patent
Yamada et al.

(10) Patent No.: US 7,312,977 B2
(45) Date of Patent: *Dec. 25, 2007

(54) SOLID ELECTROLYTIC CAPACITOR

(75) Inventors: Atsushi Yamada, Ome (JP); Katsumi Abe, Ome (JP); Toshiyuki Murakami, Ome (JP); Takashi Arai, Ome (JP); Yuuya Tamai, Ome (JP); Tomohiro Matsuzaki, Ome (JP)

(73) Assignee: Nippon Chemi-Con Corporation, Tokyo (JP)

( * ) Notice: Subject to any disclaimer, the term of this patent is extended or adjusted under 35 U.S.C. 154(b) by 91 days.

This patent is subject to a terminal disclaimer.

(21) Appl. No.: 10/529,128

(22) PCT Filed: Sep. 29, 2003

(86) PCT No.: PCT/JP03/12434

§ 371 (c)(1),
(2), (4) Date: Oct. 11, 2005

(87) PCT Pub. No.: WO2004/030004

PCT Pub. Date: Apr. 8, 2004

(65) Prior Publication Data

US 2006/0143883 A1  Jul. 6, 2006

(30) Foreign Application Priority Data

Sep. 30, 2002  (JP) .................... 2002-321814

(51) Int. Cl.
*H01G 9/00*  (2006.01)

(52) U.S. Cl. ............... 361/523; 361/525; 361/528; 361/529; 361/530; 361/516; 29/25.01; 29/25.03

(58) Field of Classification Search ........ 361/523–525, 361/528–534, 516–519, 543; 29/25.01, 25.03
See application file for complete search history.

(56) References Cited

U.S. PATENT DOCUMENTS

| | | | | |
|---|---|---|---|---|
| 5,699,597 A | * | 12/1997 | Nakamura et al. | 29/25.03 |
| 5,812,367 A | * | 9/1998 | Kudoh et al. | 361/523 |
| 5,914,852 A | * | 6/1999 | Hatanaka et al. | 361/523 |
| 6,015,638 A | * | 1/2000 | Ventura et al. | 429/307 |
| 6,154,358 A | * | 11/2000 | Fukaumi et al. | 361/523 |

(Continued)

FOREIGN PATENT DOCUMENTS

EP  0 463 391  1/1992

(Continued)

*Primary Examiner*—Nguyen T. Ha

(57) ABSTRACT

An anode foil and a cathode foil which has an oxidation film layer on the surface are separated by a separator and wound to form a capacitor element and then anodic forming is performed on this capacitor element. Next, the capacitor element is immersed in a solution of less than 10 wt %, preferably between 2.0 and 9 wt %, more preferably between 5 and 8 wt % of polyimide silicone dissolved in a ketone solvent, and after removing, the solvent is evaporated off at between 40 and 100° C. and heat treating is performed at 150 to 200° C. Next, this capacitor element was immersed in a mixture of polymeric monomer and oxidizing agent and the conductive monomer was made to polymerize in the capacitor element to form a solid electrolyte layer. Furthermore, this capacitor element was stored in an external case and the open end was sealed with sealing rubber to form the solid electrolytic capacitor.

9 Claims, 3 Drawing Sheets

U.S. PATENT DOCUMENTS

| | | | |
|---|---|---|---|
| 6,215,651 B1 * | 4/2001 | Takada et al. | 361/523 |
| 6,288,890 B1 * | 9/2001 | Saito et al. | 361/523 |
| 6,375,688 B1 * | 4/2002 | Akami et al. | 29/25.03 |
| 6,519,137 B1 * | 2/2003 | Nitta et al. | 361/525 |
| 6,733,545 B2 * | 5/2004 | Shoji et al. | 29/25.03 |
| 7,141,081 B2 * | 11/2006 | Sakai et al. | 29/25.03 |
| 2002/0117394 A1 | 8/2002 | Morokuma et al. | |

FOREIGN PATENT DOCUMENTS

| | | |
|---|---|---|
| JP | 55-53412 | 4/1980 |
| JP | 2000-114113 | 4/2000 |
| JP | 2000-133556 | 5/2000 |

* cited by examiner

SOLID ELECTROLYTIC CAPACITOR

TECHNICAL FIELD

The present invention relates to a manufacturing method for a solid electrolytic capacitor with increased voltage proof which can control the LC (leakage current) variation after reflow soldering. Furthermore, the present invention relates to a manufacturing method for a solid electrolytic capacitor by which a solid electrolytic capacitor with high electrostatic capacity can be obtained.

BACKGROUND ART

Electrolytic capacitors which use metals with a valve effect such as tantalum or aluminum or the like are widely used because a large capacity can be obtained from a small size by making the metal with a valve effect as the electrode for the anode side in the form of a sintered compact or etched foil or the like in order to increase the surface of the dielectric. In particular, solid electrolytic capacitors which use a solid electrolyte for the dielectric material, in addition to being small, having high capacity, and having a low ESR (equivalent series resistance), are easily integrated, and provide characteristics such as being suitable for front surface mounting, and therefore are critical components for reducing the size, increasing performance, and reducing the cost of electronic devices.

When used for small high capacity applications, this type of solid electrolytic capacitor generally has a structure wherein a cathode foil and an anode foil made from a valve effect metal such as aluminum are wound with a separator between to form a capacitor element, this capacitor element is impregnated with a driving electrolytic solution, and the capacitor element is stored in a metal case such as aluminum or a synthetic resin case, and then sealed. Note, aluminum, tantalum, niobium, and titanium or the like are used for the anode material, and the same metals used for the anode material are also used for the cathode material.

Furthermore, manganese dioxide and 7,7,8,8-tetracyanoquinodimethane (TCNQ) complexes are known as solid electrolytes which are used in a solid electrolytic capacitors, but in recent years, there has been technology (Japanese Patent Application Laid-open No. H2-15611) which has focused on conductive polymers such as polyethylene dioxythiophene (Hereinafter abbreviated as PEDT) which have a gradual reaction speed and excellent adhesion between the anode electrode and the oxide film layer.

Solid electrolytic capacitors, of the type where a solid electrolyte layer made from a conductive polymer such as PEDT is formed into this type of rolled capacitor element, are manufactured as shown below. First, the surface of an anode foil made from a valve effect metal such as aluminum is roughened by electrochemical etching in a chloride aqueous solution, and after a plurality of etching pits have been formed, a voltage is applied in an aqueous solution such as ammonium borate to form an oxide film layer which becomes the dielectric (anodic forming). Similar to the anode foil, the cathode foil is also made from a valve effect metal such as aluminum, but only etching is performed on this surface.

The anode foil with the oxide film layer formed on the surface in this manner and the cathode foil formed with only etching pits are separated by a separator and rolled to form a capacitor element. Next, a polymeric monomer such as 3,4-ethylenedioxythiophene (Hereinafter referred to as EDT) and an oxidizing agent solution are respectively discharged to the formed capacitor element, or the capacitor element is immersed in a mixture of both solutions, to promote the polymer reaction in the capacitor element and thereby produce a solid electrolyte layer made from a conductive polymer such as PEDT. Next, this capacitor element is stored in a cylindrical external case with a bottom, and the opening of the case is sealed with a sealing rubber to produce a solid electrolytic capacitor.

Incidentally, in recent years, these solid electrolytic capacitors have come to be used for automotive applications. Normally, the drive voltage of an automotive circuit is 12 V, but a solid electrolytic capacitor requires a high voltage proof of 25 V.

Conventionally, these high voltage proof products have been made by using the following method. Namely, products with rated voltage of up to 16 V, the voltage proof can be increased by increasing forming voltage of the foil, but products with rated voltage of above 20 V, electrical shorts frequently occur if the shape is dependent on forming voltage of the foil, so increasing the voltage proof is difficult. Therefore, as a result of investigations into this issue, the present inventors have hypothesized that the point where the oxidizing agent foil is attacked is the limit of the polymer voltage proof (around 20 V on average). Therefore, by using methods which change the formulation ratio of the monomer and the oxidizing agent and improving the separator, they have succeeded in achieving products with rated voltage of 20 V and 25 V.

However, even using the above methods, achieving products with rated voltage of 30 V or 35 V, for which development demand has been increasing in recent years, is difficult.

Furthermore, conventional solid electrolytic capacitors have the following problems in addition to the aforementioned problem.

Namely, in recent years electronic information devices have become digitized and the drive frequency is steadily increasing for the microprocessor units (MPU) which are the heart of these electronic information devices. As a result, the consumption energy is rising and heat induced reliability problems are increasing, so efforts have been made to reduce the drive voltage as a countermeasure.

In order to reduce the drive voltage, DC-DC converters known as voltage control modules are widely used as circuits to provide a highly precise power level to the microprocessor, and a plurality of low ESR capacitors for preventing voltage drop are used as output side capacitors. The aforementioned solid electrolytic capacitors are actually and widely used as capacitors which have low ESR properties.

However, the rise in drive frequency speed for microprocessors has been sharp, and the consumption power has also increased, and as result, there is demand for further increasing the power supplied from the capacitors which prevent a voltage drop. In other words, a large amount of power must be provided in a short period of time, and therefore, the solid electrolytic capacitor is required to have higher capacity, smaller size, and lower voltage, as well as excellent ESR properties.

Note, these problems are not limited to cases where EDT is used as the polymeric monomer, and similarly occur in cases using other thiophene derivatives, pyrroles, and anilines or the like.

DISCLOSURE OF THE INVENTION

A first object of the present invention is to provide a manufacturing method for a solid electrolytic capacitor which has increased voltage proof and can control LC variation after reflow soldering.

Furthermore, a second object of the present invention is to provide a manufacturing method for a solid electrolytic capacitor which can provide a solid electrolytic capacitor with high electrostatic capacity.

A first manufacturing method for the solid electrolytic capacitor of the present invention comprises the steps of anodic forming a capacitor element, immersing the capacitor element in a ketone solution containing between 2 and 10 wt % polyimide silicone, impregnating with polymeric monomer and an oxidizing agent, to form a solid electrolyte layer from the conductive polymer such that a film is formed which can block electrons, and therefore a solid electrolytic capacitor can be obtained which has higher voltage proof and can control LC variation after reflow soldering.

Furthermore, a second manufacturing method for the solid electrolytic capacitor of the present invention comprises the steps of anodic forming a capacitor element, immersing the capacitor element in a ketone solution with a polyimide silicone concentration no less than 0.05 wt % and less than 2.0 wt %., impregnating with polymeric monomer and an oxidizing agent to form a solid electrolyte layer from conductive polymer, such that a polyimide layer can be formed which has adhesive properties, and therefore, a solid electrolytic capacitor which has excellent electrostatic capacity can be obtained.

BEST MODE FOR CARRYING OUT THE INVENTION

Figure 1:
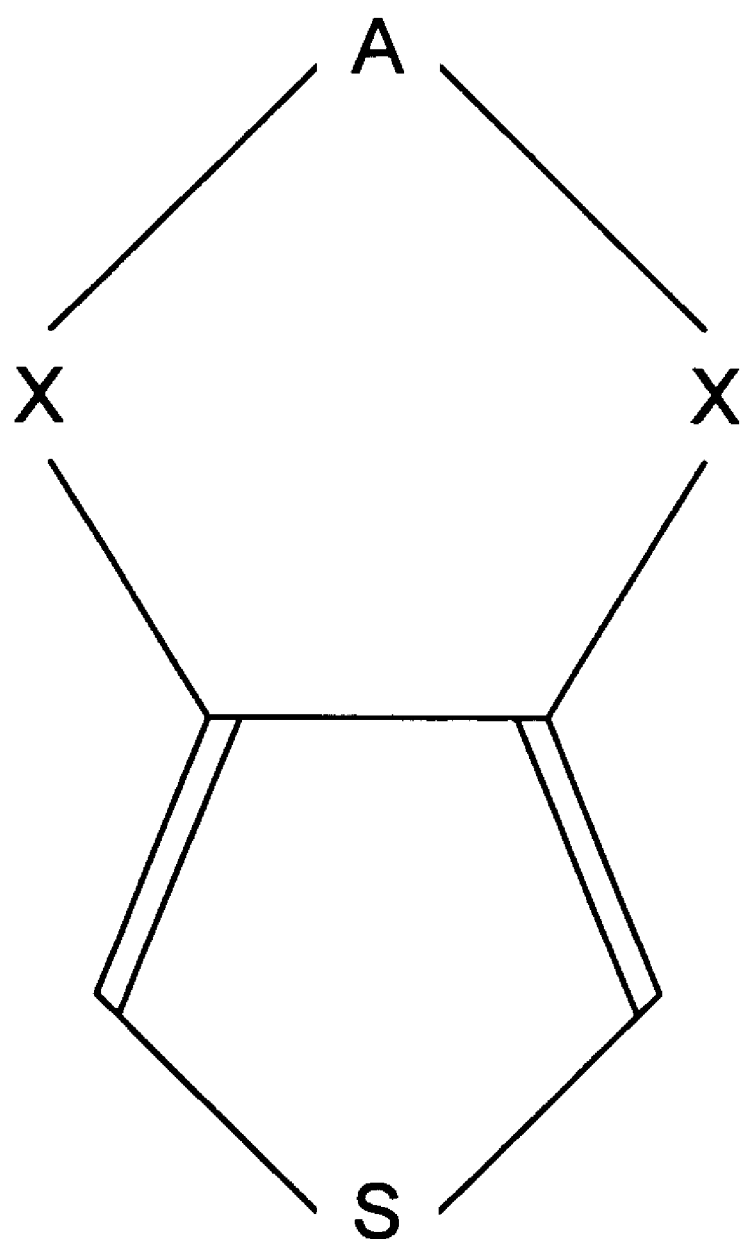
FIG. 1 is a diagram showing the structural formula of a thiophene derivative.

(A) First Embodiment (Increasing Voltage Proof and Controlling LC Variation after Reflow Soldering)

As result of diligent investigations to increase the voltage proof and control the LC variation after reflow soldering, which is the first object of the present invention, the present inventors have achieved the present invention.

In other words, the present inventors have focused on the electricity conduction mechanism, and have investigated electricity conduction in solid electrolytes such as conductive polymers or the like.

Generally, electronic discharge can be classified as either electron tunnel electrons or electric potential barrier jumping (electron jumping which is not dependent on film break-down), but leak current in solid electrolytic capacitors is thought to be electric potential barrier jumping rather than a short condition.

Furthermore, a cause of LC rise after reflow soldering is thought to be because of mechanical stress (physical stress) during reflow soldering caused by the generation of gas and because of chemical stress (oxidizing agent attack and electron jumping or the like).

In other words, when increasing the voltage proof of the solid electrolytic capacitor, a short increases the number of electrons to make an avalanche condition, which makes a tunnel condition, and for the increase in LC during reflow soldering, electron jumping will occur rather than insulation break down, so the electrons are common for both cases. Therefore, electric potential barrier jumping can be controlled by blocking the electrons and controlling the rise in LC during reflow soldering, and increasing the voltage proof is also thought to be achievable.

Based on these discoveries, the present inventors have investigated many different means for preventing electric potential barrier jumping and have discovered that increasing the voltage proof of the product and controlling the LC rise after reflow soldering can be achieved by using polyimide silicone.

(A-1) Manufacturing Method for Solid Electrolytic Capacitor

A manufacturing method for a solid electrolytic capacitor which is the first embodiment is as shown below. Namely, an anode foil and a cathode foil which has an oxidation film layer on the surface are separated by a separator and wound to form a capacitor element and then anodic forming is performed on this capacitor element. Next, the capacitor element is immersed in a solution of less than 10 wt %, preferably between 2.0 and 9 wt %, more preferably between 5 and 8 wt % of polyimide silicone dissolved in a ketone solvent, and after removing, the solvent is evaporated off at between 40 and 100° C. and heat treating is performed at 150 to 200° C. If the concentration is below this range, the voltage proof will not be sufficient, and if this range is exceeded, the electrostatic capacity will be low.

Next, this capacitor element was immersed in a mixture of polymeric monomer and oxidizing agent and the conductive monomer was made to polymerize in the capacitor element to form a solid electrolyte layer. Furthermore, this capacitor element was stored in an external case and the open end was sealed with sealing rubber to form the solid electrolytic capacitor.

(A-2) Polyimide Silicone

Solvent for dissolving the polyimide silicone include ketone type solvents which readily dissolve polyimide silicone, and cyclohexanone, acetone, and methylethyl ketone or the like may be used.

Furthermore, the concentration of the polyimide silicone solution is between 2 and 10 wt %, preferably between 2.0 and 9 wt %, and more preferably between 5 and 8 wt %.

(A-3) EDT and Oxidizing Agent

If EDT is used as the polymeric monomer, EDT monomer can be used for the EDT which is impregnated in the capacitor element, but it is also possible to use a monomer solution where EDT and a volatile solvent are mixed in a volumetric ratio of 1:0 to 1:3.

The volatile solvent may be a hydrocarbon such as pentane, an ether such as tetrahydrofuran, an ester such as ethyl formate, a ketone such as acetone, an alcohol such as methanol, or a nitride compound such as a acetonitrile or the like, but of these compounds, methanol, ethanol, and acetone or the like are preferable.

Furthermore, the oxidizing agent may be iron (II) p-toluene sulfonate dissolved in ethanol, or an aqueous solution of periodic acid or iodic acid, and the concentration of oxidizing agent in the solvent is preferably between 40 and 65 wt %, and more preferably between 45 and 57 wt %. The higher the concentration of oxidizing agent in the solvent, the lower the level of ESR. Note, solvents for the oxidizing agent can be volatile solvents which are used for monomer solutions, and of these, ethanol is preferable. The reason that ethanol is preferable as an oxidizing agent solvent is because ethanol readily evaporates because of the low vapor pressure, and therefore, the residual quantity is thought to be minimal.

(A-4) Forming Liquid for Anodic Forming

The forming liquid for anodic forming may be a phosphate forming liquid such as ammonium dihydrogen phosphate or diammonium hydrogen phosphate, a borate forming liquid such as ammonium borate, or an adipic acid forming liquid such as ammonium adipate, but of these, ammonium dihydrogen phosphate is preferable. Furthermore, the immersion time is preferably between 5 and 120 minutes.

(A-5) Other Polymeric Monomers

The polymeric monomer used for the present invention may be, in addition to the aforementioned EDT, thiophene derivatives other than EDT, aniline, pyrrole, furan, acetylene, or derivatives thereof, and any of these can be utilized if oxidation polymerized by a specific oxidizing agent and made into a conductive polymer. Note, thiophene derivatives may be those derivatives expressed by the structural formula shown in FIG. 1. In FIG. 1, X represents oxygen or sulfur atoms. If X represents oxygen, then A is an alkylene or a polyalkylene. Furthermore, if at least one of the X's represents sulfur, then A is an alkylene, polyoxyalkylene, substitution alkylene, or substitution polyoxyalkylene. Herein, substitution groups are alkyl groups, alkenyl groups, or alkoxy groups.

(A-6) Function and Effect of the First Embodiment

The reason that the effect of increased voltage proof and control of the LC variation after reflow soldering can be obtained with the structure of the present invention is thought to be as shown below.

Namely, it is thought that a film which prevents electron jumping (Hereinafter electron blocking layer) is formed on the surface of the oxide film by immersing the capacitor element in polyimide silicone solution after forming.

Furthermore, the voltage proof is increased, and attacking of the foil by the oxidizing agent is prevented by this electron blocking layer, so the initial LC will be reduced. Furthermore, coating of aluminum lead with polyimide silicone is performed and control of LC (leakage current) rise after reflow soldering is possible. Furthermore, electrostatic capacity and ESR are not easily affected, but controlling the voltage proof is thought to be possible by controlling the film thickness of this electron blocking layer. Furthermore, the forming voltage of currently used foils can be reduced so the solid electrolytic capacitor can be made smaller and can have increased capacity or the like.

(A-7) Examples Relating to the First Embodiment

The invention of the first embodiment will be described in further detail based on examples A1 through A3 of the present invention and a conventional example produced as shown below.

Example A1

A means for retrieving electrodes is connected to a cathode foil and an anode foil which has an oxide film layer formed on the surface, the electrode foils are separated by a separator, and wound to form a capacitor element. Furthermore, this capacitor element is immersed for 40 minutes in an ammonium dihydrogen phosphate aqueous solution and anodized. Next, this capacitor element is immersed in a 2 wt % polyimide silicone solution of cyclohexanone, and after removal, the capacitor element is heat treated for one hour at 170° C.

Next, a solution is prepared by injecting EDT and a 40 wt % butanol solution of iron (II) p-toluene sulfonate into a specified container to achieve a specific gravity of 1:3, and the capacitor element is immersed for 10 seconds in this solution so that EDT and the oxidizing agent are impregnated into the capacitor element. Furthermore, the capacitor element is placed in a 120° C. heating chamber for one hour so that a PEDT polymerizing reaction will occur in the capacitor element to form a solid electrolyte layer. Next, the capacitor element is stored in an aluminum case which is a cylinder with bottom, and sealed with a sealing rubber to form a solid electrolytic capacitor.

Example A2

A capacitor element was immersed in a 6 wt % solution of polyimide silicone in cyclohexanone, and after removal, was heat treated at 170° C. for one hour. A solid electrolytic capacitor was then made using the same conditions and processes as example 1.

Example A3

A capacitor element was immersed in a 10 wt % solution of polyimide silicone in cyclohexanone, and after removal, was heat treated at 170° C. for one hour. A solid electrolytic capacitor was then made using the same conditions and processes as example 1.

Conventional Example

A solid electrolytic capacitor was also made using the same conditions and processes as example 1 of the present invention except that the capacitor element was not immersed in a solution of polyimide silicone in cyclohexanone.

Comparison Results 1

Figure 2:
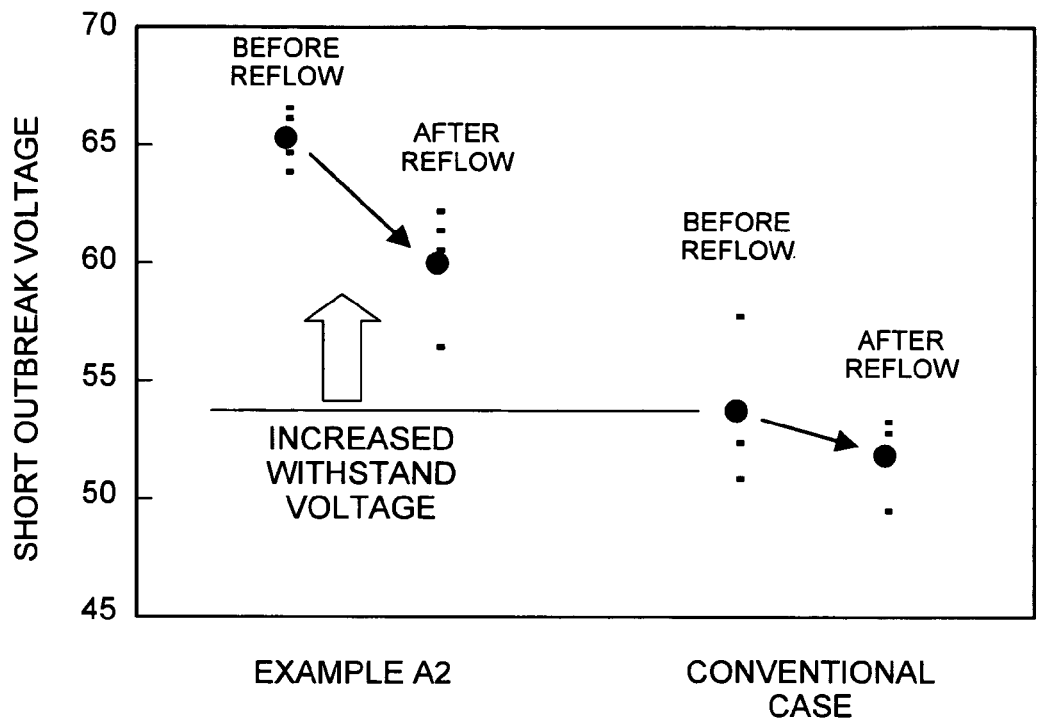
FIG. 2 is a diagram comparing the voltage proof of a product of the present invention and a conventional product.

The conventional example and example A2 of the present invention obtained by the method described above were evaluated for voltage proof change before and after reflow soldering, and the results obtained are shown in FIG. 2. As can be seen from FIG. 2, the voltage proof after reflow soldering was also increased.

Comparison Results 2

Figure 3:
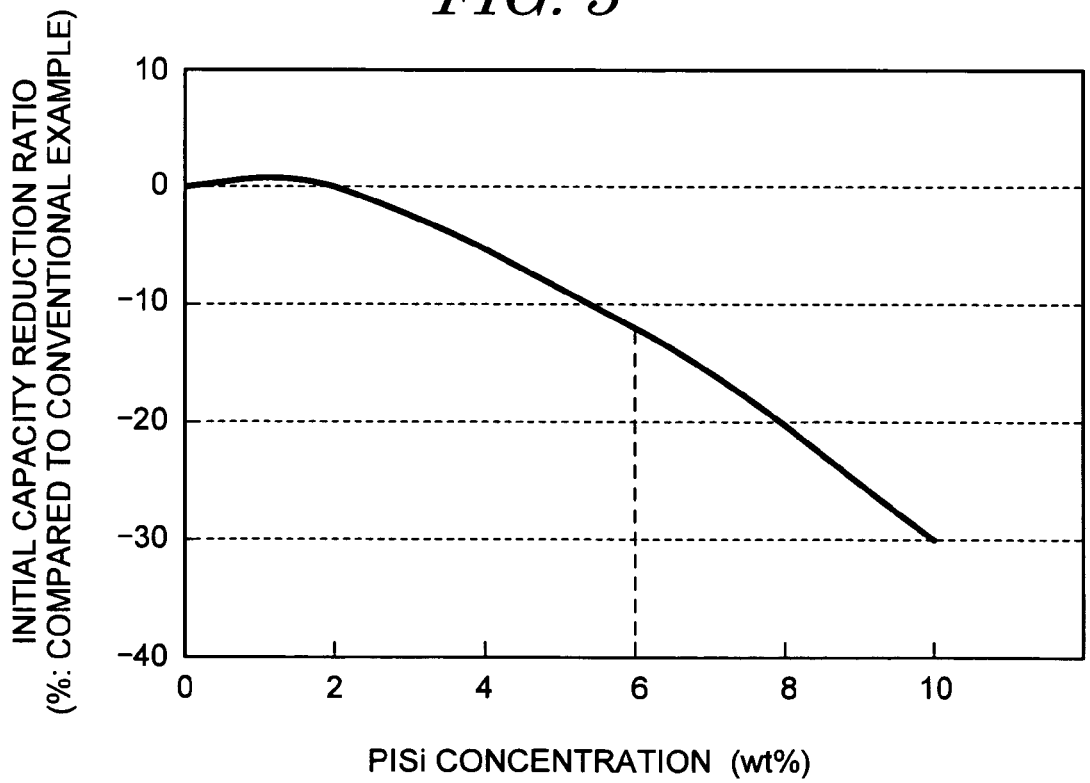
FIG. 3 is a diagram showing the relationship between added polyimide silicone (PISi) concentration and capacity.

The conventional example and examples A1 through A3 of the present invention obtained by the methods described above were evaluated for polyimide silicone concentration and the reduction ratio for initial capacity, and the results obtained are shown in FIG. 3. Note, the reduction ratio for initial capacity is expressed as a percentage of the conventional example.

Figure 4:
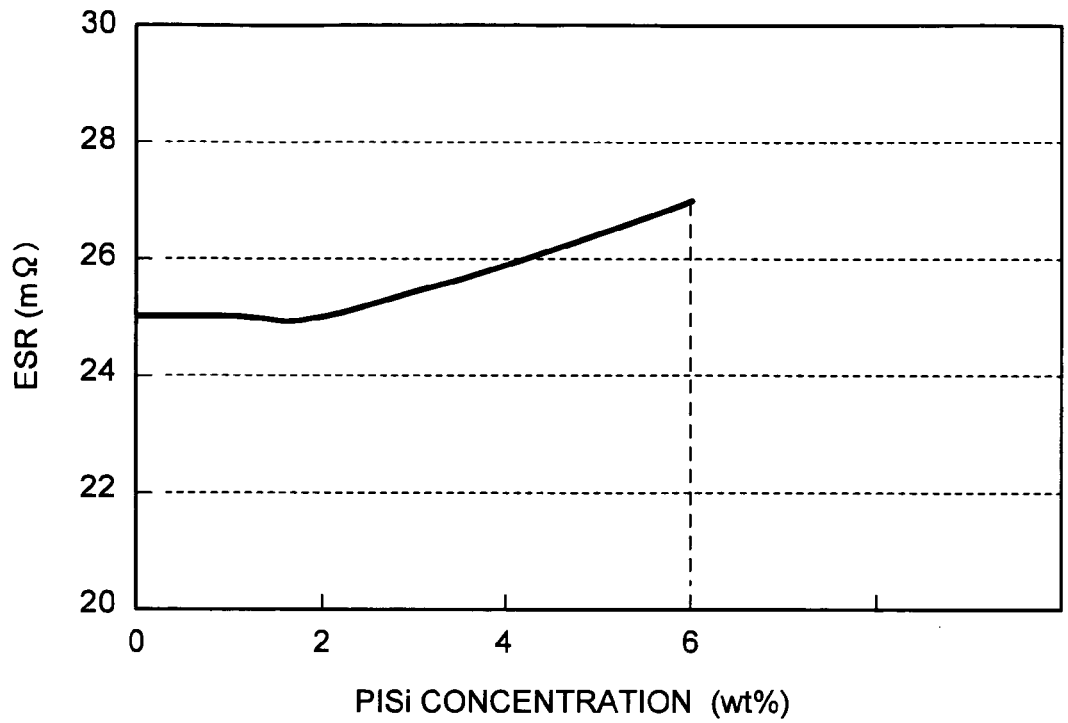
FIG. 4 is a diagram showing the relationship between added polyimide silicone (PISi) concentration and ESR.

Furthermore, examples A1 through A3 of the present invention obtained by the methods described above were evaluated for the relationship between polyimide silicone concentration and ESR, and the results obtained are shown in FIG. 4.

Comparison Results 3

Figure 5:
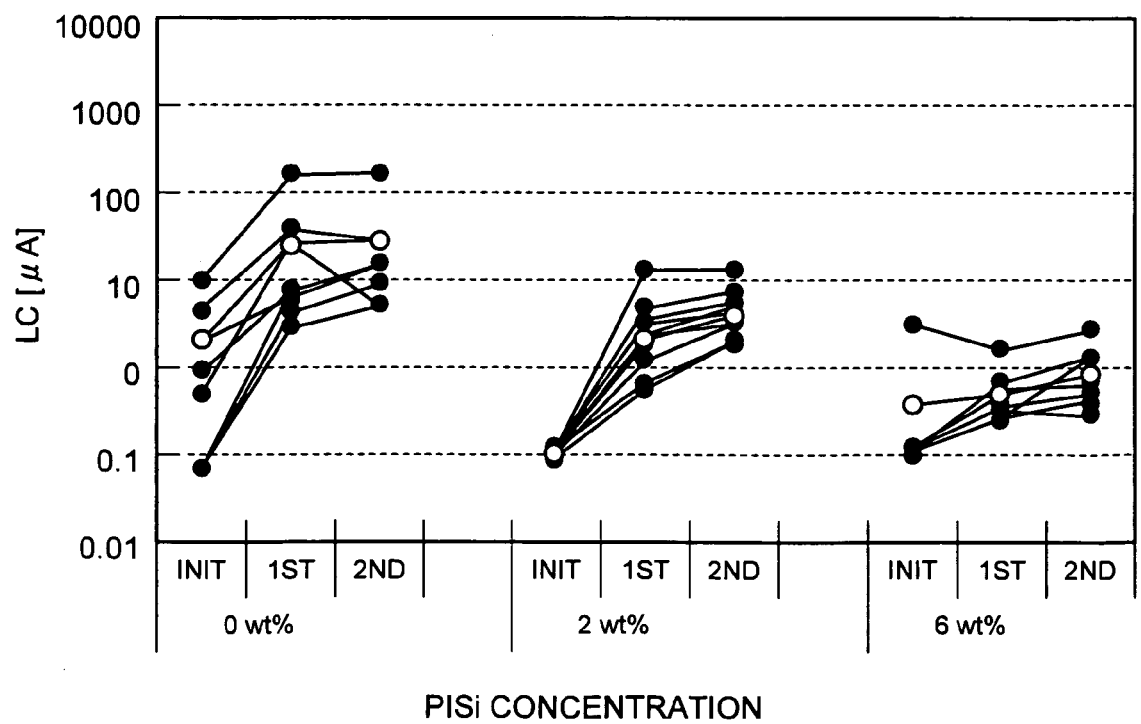
FIG. 5 is a diagram showing the added polyimide silicone (PISi) concentration and the LC behavior before and after reflow soldering.

The conventional example and example A2 and example A3 the present invention which were obtained by the methods described above were evaluated for concentration of polyimide silicone and LC behavior before and after reflow soldering, and the results obtained are shown in FIG. 5. Note, the reflow soldering conditions were: lead free conditions, number of samples equals 10, peak temperature was 250° C., and the residence time at a temperature of no less than 230° C. was 40 seconds. Furthermore, "Initial" in the figure shows the initial properties, "First time" shows the LC value after the reflow soldering test was performed one time, and "Second time" shows the LC value after the reflow soldering test was then performed one more time.

As can be seen from FIG. 5, the current also increased after reflow soldering. The leak flow of the 6 wt % example was controlled to more than 10, A below that of the 2 wt % example, so better properties were obtained.

Comparison Results 4

Furthermore, the conventional example and examples A1 through A3 of the present invention obtained by the methods described above were evaluated for electrical properties, and the results obtained are shown in Table 1.

TABLE 1

| | CONTENT OF ADDITIVE (wt %) | INITIAL CHARACTERISTICS | | | LC (μA) | |
|---|---|---|---|---|---|---|
| | | VOLTAGE PROOF (V) | ESR (mΩ) | Δ CAP (%) | INITIAL | AFTER REFLOW |
| EXAMPLE A1 | 2.0 | 66 | 25.0 | 0 | 0.1 | 5 |
| EXAMPLE A2 | 6.0 | 74 | 26.0 | −18 | 0.1 | 0.9 |
| EXAMPLE A3 | 10.0 | 75 | 26.5 | −30 | 0.1 | 0.9 |
| CONVENTIONAL EXAMPLE | — | 58 | 25.0 | 0 | 0.5 | 150 |

As can be seen from Table 1, examples A1 through A3 of the present invention, wherein the capacitor element was immersed in polyimide silicone solution after anodic forming, all had a higher voltage proof than the conventional example, and LC after reflow soldering was dramatically reduced.

(B) Second Embodiment (Electrostatic Capacity Increase)

As result of diligent investigations to increase the electrostatic capacity, which is the second object of the present invention, the present inventors have achieved the present invention. In other words, the present inventors have focused on the adhesion of polyimide silicone, and during investigations of the polyimide silicone processing conditions which most effectively provide adhesion, have discovered that excellent results can be obtained if the polyimide silicone concentration is no less than 0.05 wt % and less than 2 wt %.

(B-1) Manufacturing Method for Solid Electrolytic Capacitor

A manufacturing method for a solid electrolytic capacitor which is the second embodiment is as shown below. Namely, an anode foil and a cathode foil which has an oxidation film layer on the surface are separated by a separator and wound to form a capacitor element, and then anodic forming is performed on this capacitor element. Next, the capacitor element is immersed in a solution of polyimide silicone in a ketone where the concentration is no less than 0.05 wt % and less than 2 wt %, and after removing, the solvent is evaporated off at between 40 and 100° C., and then heat treating at 150 to 200° C. is performed. If the concentration is below this range, the voltage proof will not be sufficient, and if this range is exceeded, the electrostatic capacity will be low.

Next, this capacitor element was immersed in a mixture of polymeric monomer and oxidizing agent and the conductive monomer was made to polymerize in the capacitor element to form a solid electrolyte layer. Furthermore, this capacitor element was stored in an external case and the open end was sealed with sealing rubber to form the solid electrolytic capacitor.

(B-2) Polyimide Silicone

Solvent for dissolving the polyimide silicone includes ketone type solvents which readily dissolve polyimide silicone, and cyclohexanone, acetone, or methylethyl ketone, or the like maybe used.

Furthermore, the concentration of the polyimide silicone solution is preferably no less than 0.05 wt % and less than 2 wt %. If the concentration of polyimide silicone is greater than 2 wt %, the insulative properties of the formed polyimide silicone layer will be too high, so the electrostatic capacity will be reduced. On the other hand, if the concentration is less than 0.05 wt %, sufficient electrostatic capacity will not be obtained.

(B-3) EDT and Oxidizing Agent

If EDT is used as the polymeric monomer, EDT monomer can be used for the EDT which is impregnated in the capacitor element, but it is also possible to use a monomer solution where EDT and a volatile solvent are mixed in a volumetric ratio of 1:0 to 1:3.

The volatile solvent may be a hydrocarbon such as pentane, an ether such as tetrahydrofuran, an ester such as ethyl formate, a ketone such as acetone, an alcohol such as methanol, or a nitride compound such as a acetonitrile or the like, but of these compounds, methanol, ethanol, and acetone or the like are preferable.

Furthermore, the oxidizing agent may be iron p-toluene sulfonate dissolved in ethanol, or an aqueous solution of periodic acid or iodic acid, and the concentration of oxidizing agent in the solvent is preferably between 40 and 65 wt %, and more preferably between 45 and 57 wt %. The higher the concentration of oxidizing agent in the solvent, the lower the level of ESR. Note, solvents for the oxidizing agent can be volatile solvents which are used for monomer solutions, and of these, ethanol is preferable. The reason that ethanol is preferable as an oxidizing agent solvent is because ethanol readily evaporates because of the low vapor pressure, and therefore, the residual quantity is thought to be minimal.

(B-4) Forming Liquid for Anodic Forming

The forming liquid for anodic forming may be a phosphate forming liquid such as ammonium dihydrogen phosphate or diammonium hydrogen phosphate, a borate forming liquid such as ammonium borate, or an adipic acid forming liquid such as ammonium adipate, but of these, ammonium dihydrogen phosphate is preferable. Furthermore, the immersion time is preferably between 5 and 120 minutes.

(B-5) Other Polymeric Monomers

The polymeric monomer used for the present invention may be, in addition to the aforementioned EDT, thiophene derivatives other than EDT, aniline, pyrrole, furan, acetylene, or derivatives thereof, and any of these can be utilized if oxidation polymerized by a specific oxidizing agent and made into a conductive polymer. Note, thiophene derivatives may be those derivatives expressed by the structural formula shown in FIG. 1.

(B-6) Function and Effect of the Second Embodiment

The reason that the effect of increased electrostatic capacity can be obtained with the structure of the present invention is thought to be as shown below.

Namely, the reason that the electrostatic capacity increases when the concentration of polyimide silicone is within the range of greater than 0.05 wt % and less than 2 wt % is thought to be as shown below. Namely, the polyimide which is a part of the polyimide silicone and conductive polymers like PEDT are both organic compounds, so adhesion is good, and the silicon and the derivative oxide film ($Al_2O_3$) are both inorganic compounds, so adhesion is good, and as a result, it is thought that there is an increase in adhesion between the conductive polymer and the derivative oxide layer through the polyimide silicone layer, and therefore the electrostatic capacity is increased.

(B-7) Examples Relating to the Second Embodiment

Next, this embodiment of the invention will be described in further detail based on examples B1 through B4 of the present invention and a comparison example as shown below.

Example B1

A means for retrieving electrodes is connected to a cathode foil and an anode foil which has an oxide film layer formed on the surface, the electrode foils are separated by a separator, and wound to form a capacitor element. Furthermore, this capacitor element is immersed for 40 minutes in an ammonium dihydrogen phosphate aqueous solution and anodized. Next, this capacitor element is immersed in a 0.5 wt % polyimide silicone solution of cyclohexanone, and after removal, the capacitor element is heat treated for one hour at 170° C.

Next, a liquid mixture is prepared by injecting EDT and a 45 wt % butanol solution of iron (II) p-toluene sulfonate into a specified container to achieve a molar ratio of 6:1, and the capacitor element is immersed for 10 seconds in this solution so that EDT and the oxidizing agent are impregnated in the capacitor element. Furthermore, the capacitor element is placed in a 120° C. heating chamber for one hour so that a PEDT polymerizing reaction will occur in the capacitor element to form a solid electrolyte layer. Next, the capacitor element is stored in an aluminum case which is a cylinder with bottom, and sealed with a sealing rubber to form a solid electrolytic capacitor. Note, the rated voltage of the solid electrolytic capacitor was 25 WV, and the rated capacity was 10,F.

Example B2

The concentration of the polyimide silicone and cyclohexanone solution was set to 1.0 wt %. A solid electrolytic capacitor was made with all other conditions and processes similar to example 1.

Example B3

The concentration of the polyimide silicone and cyclohexanone solution was set to 1.5 wt %. A solid electrolytic capacitor was made with all other conditions and processes similar to example 1.

Example B4

The concentration of the polyimide silicone and cyclohexanone solution was set to 2.0 wt %. A solid electrolytic capacitor was made with all other conditions and processes similar to example 1.

Comparison Example

A solid electrolytic capacitor was made under the same conditions as the aforementioned example B1 of the present invention, except that polyimide silicone processing was not performed.

Comparison Results

The examples of the present invention and the comparison example obtained by the aforementioned methods were evaluated for electrostatic capacity, and the results are shown in Table 2.

TABLE 2

|  | PISi (wt %) | ELECTROSTATIC CAPACITY ($\mu$F) |
|---|---|---|
| EXAMPLE B1 | 0.5 | 10.1 |
| EXAMPLE B2 | 1.0 | 9.8 |
| EXAMPLE B3 | 1.5 | 9.5 |
| EXAMPLE B4 | 2.0 | 9.0 |
| COMPARATIVE EXAMPLE | — | 9.0 |

As can be seen from Table 2, the electrostatic capacity was between 5 and 12% higher in the examples B1 through B3 of the present invention, where the polyimide silicone concentration was between 0.5 and 1.5 wt %, than in the comparison example.

INDUSTRIAL APPLICABILITY

According to the invention shown in the first embodiment, by immersing a post-anodic forming capacitor element in a polyimide silicone solution with a concentration between 2 wt % and 10 wt %, a manufacturing method could be provided for a solid electrolytic capacitor which had increased voltage proof and which could control LC variation after reflow soldering.

Furthermore, according to the invention shown in the second embodiment, by immersing a post-anodic forming capacitor element in a polyimide silicone solution with a concentration of no less than 0.05 wt % and less than 2 wt %, a manufacturing method could be provided for a solid electrolytic capacitor which could have higher electrostatic capacity.

Therefore, with the present invention, if electrostatic capacity properties are necessary, the concentration of the polyimide silicone solution for immersion after anodic forming is adjusted to be no less than 0.05 wt % and less than 2 wt %, and if electrostatic capacity properties are not necessary, a solid electrolytic capacitor can be provided which has increased voltage proof and which can control the LC variation after reflow soldering by adjusting the concentration of the polyimide solution to within the range of 2 to 10 wt %.

The invention claimed is:

1. A manufacturing method for a solid electrolytic capacitor comprising a solid electrolyte and an anode made from a valve metal with an oxide film on the surface, comprising a step of:

immersing an element with said solid electrolyte formed, in a polyimide silicone solution, to form a film which blocks electrons.

2. The manufacturing method for a solid electrolytic capacitor according to claim 1, characterized in that the concentration of said polyimide silicone solution is between 2.0 wt % and 10 wt %.

3. The manufacturing method for a solid electrolytic capacitor according to claim 1, characterized in that the concentration of said polyimide silicone solution is no less than 0.05 wt% and less than 2.0 wt%.

4. The manufacturing method for a solid electrolytic capacitor according to claim 1, characterized in that said polymeric monomer is a thiophene derivative.

5. The manufacturing method for a solid electrolytic capacitor according to claim 4, characterized in that said thiophene derivative is 3, 4-ethylenedioxythiophene.

6. A manufacturing method for a solid electrolytic capacitor wherein a solid electrolytic layer comprising a conductive polymer is formed by impregnating a polymeric monomer and an oxidizing agent into a capacitor element wound with an anode foil and a cathode foil with a separator therebetween, comprising the steps of: immersing said capacitor element in a polyimide silicone solution, to form a film which blocks electrons; and forming a solid electrolytic layer comprising said conductive polymer thereafter.

7. The manufacturing method for a solid electrolytic capacitor according to claim 6, characterized in that the concentration of said polyimide silicone solution is between 2.0 wt % and 10 wt %.

8. The manufacturing method for a solid electrolytic capacitor according to claim 6, characterized in that the concentration of said polyimide silicone solution is no less than 0.05 wt % and less than 2.0 wt %.

9. The manufacturing method for a solid electrolytic capacitor according to claim 6, characterized in that said polymeric monomer is a thiophene derivative.

* * * * *